3,413,093
CARBON BLACK MANUFACTURE
George F. Friauf, Pampa, Tex., and Merrill E. Jordan and Harvey M. Cole, Walpole, Mass., assignors to Cabot Corporation, Boston, Mass., a corporation of Delaware
No Drawing. Filed Apr. 28, 1961, Ser. No. 106,155
4 Claims. (23—209.4)

This invention relates to the production of carbon black and is concerned specifically with modifications and improvements in the basic process for forming carbon black by means of the thermal decomposition or cracking of hydrocarbon materials.

In the commercial production of carbon blacks, the yield of black of a given quality which is obtained from a given raw material is a most important economic consideration. Normally, when, with a given raw material, adjustment of the process variables is made in order to produce a black of higher surface area, invariably a corresponding decrease in product yield results, the magnitude of the decrease in yield being more or less proportional to the magnitude of the increase in surface area. Consequently, when high surface area carbon blacks are produced, yield is very substantially and distressingly decreased. In accordance with the present invention, however, it was discovered that by continuously introducing certain additives into the reaction zone in which the carbon black is being formed, the yield-surface area relationship of the product carbon black obtained from a given raw material can be greatly improved.

It is accordingly a principal object of this invention to provide an improved process for producing carbon black.

It is another object of this invention to provide a method of obtaining increased yields of carbon black, particularly of carbon blacks of very high surface area, which blacks tend to be very valuable due to their high coloring and reinforcing power and their high adsorptivity.

Another object of the present invention is to provide a method for adjusting and/or controlling the performance characteristics of carbon black in various applications such as modulus in rubber.

Other objects will in part be obvious and will in part appear hereinafter.

In accordance with the present invention it was discovered that the yield-surface area relationship for the product blacks obtained from a given fuel can be greatly improved by continuously introducing into the reaction zone in which the carbon black is being formed an element chosen from the group consisting of magnesium, strontium, calcium and barium.

The exact amount of these elements to be utilized to obtain a given effect in accordance with the teachings of the present invention, will, of course, depend upon which one(s) are utilized, for example, calcium and strontium are generaly effective at lower concentrations than magnesium and barium, the raw material used, as well as the exact procedural steps of the process being utilized. Although measurable effects can often be detected at lower concentrations, significant effects in practical applications are achieved by introducing into the carbon black forming reaction zone, at least about 500 parts by weight of said element per million parts by weight of carbon black being formed. Optimum effects upon the yield-surface area relationship will usually be achieved when said elements are introduced in amounts ranging from about 1500 to about 20,000 parts by weight per million parts by weight of carbon black produced. However, in some cases the maximum effects will not be reached until still higher concentrations of said elements are introduced and in any case advantageous results can still be generally obtained when said elements are utilized in amounts greater than 20,000 parts per million parts by weight on the black formed.

Therefore, the maximum rate at which said elements can be utilized with advantage in the carbon forming reaction will usually depend upon the amount of extraneous material that can be tolerated in the finished carbon black product. This in turn, of course, depends upon the intended use for said product. From this point of view, the rate of introduction of said elements can sometimes reach about 40,000 parts per million parts (representing about 4%) by weight of the black if desired and for certain specialized applications can run as high as 100,000 parts per million or even more.

In any case, the amounts of said elements introduced as specified above may consist entirely of a single element or of two or more of any combination of these elements. Likewise, these elements are effective when added to the carbon forming reaction in any form whatsoever, whether in elemental form or in chemical combination; whether in solid, liquid or vapor state; and whether dissolved or suspended in a carrier such as water, aqueous media, organic media, including the hydrocarbon raw materials from which the black is being made, or suspended in vapors or gases such as the combustion air or the fuel gases which are often burned in contact with the make hydrocarbon in order to supply the heat necessary for the thermal decomposition of said hydrocarbon to form carbon black. Generally speaking, such elements can be handled most easily and conveniently in the form of their chemical compounds because the compounds are readily available and simplify the problem of supplying the elements themselves in uniform concentration. For example, suitable compounds containing said elements may be either inorganic such as their chlorides, nitrates, sulfates etc., or metallo-organic such as their salts with organic acids, including the fatty acids, etc.

It is usually most advantageous to introduce these elements into the reaction zone in diluted or extended form since the maintenance of a uniform rate of addition and level of concentration is thereby greatly facilitated. Thus, it is often desirable to introduce them in the form of a dilute aqueous solution of their water soluble compounds or in an analogous dilute organic solution or aqueous emulsion. Nor is it necessary in obtaining such solutions to start with a pure or chemically refined compound or element.

There follow a number of non-limiting illustrative examples:

EXAMPLE 1

A carbon black furnace was operating on about 60 gallons per hour of an aromatic concentrate extracted from the recycle stock from a petroleum refinery cracking operation. The properties of this feed stock are given in the following table:

Feed stock properties:
| | |
|---|---:|
| Specific gravity, 60° F./60° F. | 1.0591 |
| Viscosity at 130° F., SSU | 412 |
| Viscosity at 210° F., SSU | 64 |
| Asphaltenes content, percent | 0.82 |
| Ash content, percent | 0.007 |
| H/C ratio | 1.16 |
| Initial boiling point (ASTM) | 388° F. |

The above feed stock was preheated to about 480° F. and used as the carbon black make liquid by introducing it axially into the cylindrical reaction zone of the furnace through an air-atomization spray nozzle located at the center of the upstream end of said furnace. The atomized make liquid was thermally decomposed with the aid of a turbulent combustion reaction maintained by six jets of natural gas introduced through six separate orifices equally spaced concentrically around the atomization nozzle and a stream of air entering the annular space surrounding the gas jets through a spiral scroll at the same end of the furnace.

Operating in this way in said furnace which comprises a short cylindrical section about 18″ in diameter and 9″ long followed by a second short constricted cylindrical section about 9″ in diameter and 9″ long, and using a total of about 3,000 s.c.f./hr. of natural gas and about 58,200 s.c.f./hr. of air, furnace black having a surface area of about 96 sq. meters per gram as measured by an iodine adsorption technique was produced at a rate of about 200 lbs./hr.

The iodine adsorption technique utilized comprises mixing a weighed sample of carbon black with a standard iodine solution. The carbon black is then removed by centrifugation and the remaining iodine solution titrated against a standard thiosulfate solution. In this way it is determined what quantity of iodine was adsorbed by the surface of the carbon black, which quantity is directly related to the surface area of said black.

EXAMPLE 2

The feed stock and the general operating conditions in this example were the same as in Example 1 except that the quantity of air utilized in this example was reduced to 48,100 s.c.f./hr. Also, in this example there was introduced into the make liquid immediately ahead of the atomization nozzle 80 ml./minute of an aqueous solution of $Ba(ClO_4)_2$ containing 1095 grams $Ba(ClO_4)_2$ per gallon. The product carbon black had an "iodine" surface area of about 106 sq. meters per gram and was produced at the rate of about 234 lbs./hr., or an increase of about 17% in production rate and yield, even though surface area increased slightly.

A simple calculation from the above data shows that the $Ba(ClO_4)_2$ solution added in the above run provided barium to the reaction zone of the furnace at a rate of about 5344 parts per million parts by weight of black formed.

Substantially the same results are obtained in the above example when the $Ba(ClO_4)_2$ solution is introduced into the furnace in either the air or the natural gas streams.

Substantially the same results are also obtained when the $Ba(ClO_4)_2$ solution is itself injected directly into the reaction zone of the furnace.

It should be noted that when an additive is utilized in accordance with the teachings of the present invention the quantity of air required to produce carbon black having a given surface area is substantially reduced. Accordingly, the hydrocarbon through-put of a given carbon black furnace in producing a carbon black of given surface area can be significantly increased. This means that, with the present invention, a further incremental increase in production rate can usually be obtained over and above that due to the increased yield.

EXAMPLE 3

The same carbon black furnace utilized in Example 1 was again operated on the same feed stock and under the same general set of conditions except that to the furnace there was fed (a) a total of 49,700 s.c.f./hr. air and (b) 80 ml./minute of an aqueous solution of $Ba(ClO_4)_2$ containing 919.5 grams $Ba(ClO_4)_2$ per gallon. The product carbon black had an "iodine" surface area of about 164 sq. meters per gram and was produced at a rate of about 221 lbs./hr., representing an increase of about 71.9% in surface area together with an increase of about 10% in production rate and yield when compared with Example 1.

EXAMPLE 4

The same carbon black furnace utilized in Example 1 was again operated on the same feed stock and under the same general set of conditions except that (a) to the furnace there was fed 49,100 s.c.f./hr. air preheated to 700° F. and (b) there was introduced into the make liquid immediately ahead of the atomization nozzle about 117 ml./minute of an aqueous solution of $CaCl_2$ containing about 871 grams $CaCl_2$ per gallon. The product carbon black had an "iodine" surface area of about 374 sq. meters per gram and was produced at the rate of about 170 lbs./hr., representing an increase of about 290% in surface area with only about a 15% drop in production rate and yield when compared with Example 1.

Also, it was found that this carbon black was capable of decolorizing molasses.

It should be pointed out that when additives are utilized in accordance with the present invention, properties other than the yield-surface area relationship of the product black are sometimes also affected. In particular, the carbon black of the present invention, when compounded in rubber, gives cured stock characterized by greatly reduced modulus values as compared to identical compositions containing a control black of equivalent surface area produced with no additive.

There follow a number of non-limiting illustrative examples:

EXAMPLE 5

The same carbon black furnace utilized in Example 2 is again operated on the same feed stock and under the same general set of conditions except that 80 ml./minute of an aqueous solution of $MgCl_2$ containing about 1471 grams $MgCl_2$ per gallon are utilized instead of the $Ba(ClO_4)_2$ solution. The product carbon black has an iodine surface area of about 115 sq. meters per gram and is produced at the rate of about 205 lbs./hr. This black when compounded in rubber gives a 300% modulus value approximately 27% lower than a control produced without the use of any additive.

EXAMPLE 6

The same carbon black furnace utilized in Example 2 is again operated on the same feed stock and under the same general set of conditions except that 131 ml./minute of an aqueous solution of $SrCl_2 \cdot 6H_2O$ containing about 315 grams $SrCl_2 \cdot 6H_2O$ per gallon are utilized instead of the $Ba(ClO_4)_2$ solution. The product carbon black is produced at the rate of about 210 lbs./hr., and has a surface area of about 140 sq. meters per gram representing an increase of about 31% in surface area over the control. The black when compounded in rubber gives a 300% modulus value approximately 14% lower than a control of equivalent surface area produced without the use of an additive.

Obviously many changes may be made in the above description and examples without departing from the scope of the invention. Accordingly, it is intended that the description and examples be regarded as illustrative and as in no way limiting the scope of the invention.

What we claim is:

1. In a process for preparing carbon black by thermally decomposing a normally liquid hydrocarbon feedstock in a reaction zone, the improved method for regulating and controlling the structural characteristics of the resultant carbon black which comprises continuously introducing into the reaction zone, along with the hydrocarbon feedstock, an alkaline earth metal halide selected from the group consisting of calcium halides and strontium halides in a measured amount which is sufficient to impart the desired structural characteristics to the carbon black produced.

2. In a process for preparing carbon black by thermally decomposing a normally liquid hydrocarbon feedstock in a reaction zone, the improved method for regulating and controlling the characteristics of the resultant carbon black which comprises; continuously introducing into the reaction zone, along with the hydrocarbon feedstock, an alkaline earth metal salt selected from the group consisting of calcium salts and strontium salts in a measured amount which is sufficient to impart the desired characteristics to the carbon black produced.

3. In a process for producing carbon black by the thermal decomposition of a fluid hydrocarbon flowing through an enclosed high temperature, carbon forming, reaction zone which is maintained at carbon forming temperatures with the aid of a molecular oxygen supported combustion reaction proceeding simultaneously within said zone, the improvement which comprises improving the yield-surface area relationship of the carbon black product obtained by continuously introducing at a controlled rate into said carbon forming reaction zone a substance comprising strontium in amounts sufficient to provide between about 1500 and about 40,000 parts by weight of strontium per million parts by weight of carbon black produced, the particular proportion of strontium used being directly related to the extent of improvement desired in the yield-surface area relationship of said carbon black product.

4. In a process for producing carbon black by thermal decomposition of a fluid hydrocarbon flowing through an enclosed high temperature, carbon forming, reaction zone which is maintained at carbon forming temperatures with the aid of a molecular oxygen supported combustion reaction proceeding simultaneously within said zone, the improvement which comprises improving the yield-surface area relationship of the carbon black product obtained by continuously introducing at a controlled rate into said carbon forming reaction zone a substance comprising calcium in amounts sufficient to provide between about 1500 and about 40,000 parts by weight of calcium per million parts by weight of carbon black produced, the particular proportion of calcium used being directly related to the extent of improvement desired in the yield-surface area relationship of said carbon black product.

References Cited

UNITED STATES PATENTS

| 3,010,794 | 11/1961 | Friauf et al. | 23—209.4 |
| 1,418,385 | 6/1922 | Masson | 23—209.5 |
| 1,868,920 | 7/1932 | Schmidt et al. | 23—209.5 |
| 2,760,847 | 8/1956 | Oblad et al. | 23—209.5 |

FOREIGN PATENTS

| 339 | 1854 | Great Britain. |
| 361,837 | 11/1931 | Great Britain. |

EDWARD J. MEROS, *Primary Examiner.*